United States Patent [19]

Quartano

[11] Patent Number: 4,666,207
[45] Date of Patent: May 19, 1987

[54] CHILD SHOPPING CART CUSHION

[75] Inventor: Anthony G. Quartano, Leonardtown, Md.

[73] Assignee: Billie Waters Quartano, Leonardtown, Md.

[21] Appl. No.: 777,414

[22] Filed: Sep. 18, 1985

[51] Int. Cl.[4] .................................. A47D 15/00
[52] U.S. Cl. .................... 297/229; 297/468; 297/488
[58] Field of Search .......... 297/219, 229, 485, 487, 297/488, 250, 218, 468; 280/33.99 B

[56] References Cited

U.S. PATENT DOCUMENTS

| | | | |
|---|---|---|---|
| 1,538,538 | 5/1925 | Wood | 297/229 |
| 2,652,183 | 9/1953 | Hlivka | 297/229 |
| 3,078,101 | 2/1965 | Reese | 297/219 X |
| 3,578,380 | 5/1971 | Jacubus | 297/229 |
| 3,602,548 | 8/1971 | Grams | 297/456 |
| 3,612,605 | 10/1971 | Posey | 297/485 |
| 4,076,307 | 2/1978 | Nanba et al. | 297/488 |
| 4,324,430 | 4/1982 | Dimas et al. | 280/33.99 B |
| 4,416,462 | 11/1983 | Thompson | 297/250 |

Primary Examiner—Francis K. Zugel
Attorney, Agent, or Firm—William F. Frank

[57] ABSTRACT

The present invention provides a cushioned seating device for a child seated on the shelf providing element of a shopping cart, and also an adjunct cushioning and safety insert child's car seat, which device has a seating and back cushion and a cushioned groin protecting link attached to a chest protecting element. The invention additionally provides means to substantially stabilize a child against lateral movement when seated on the shopping cart shelf.

4 Claims, 3 Drawing Figures

U.S. Patent   May 19, 1987   4,666,207
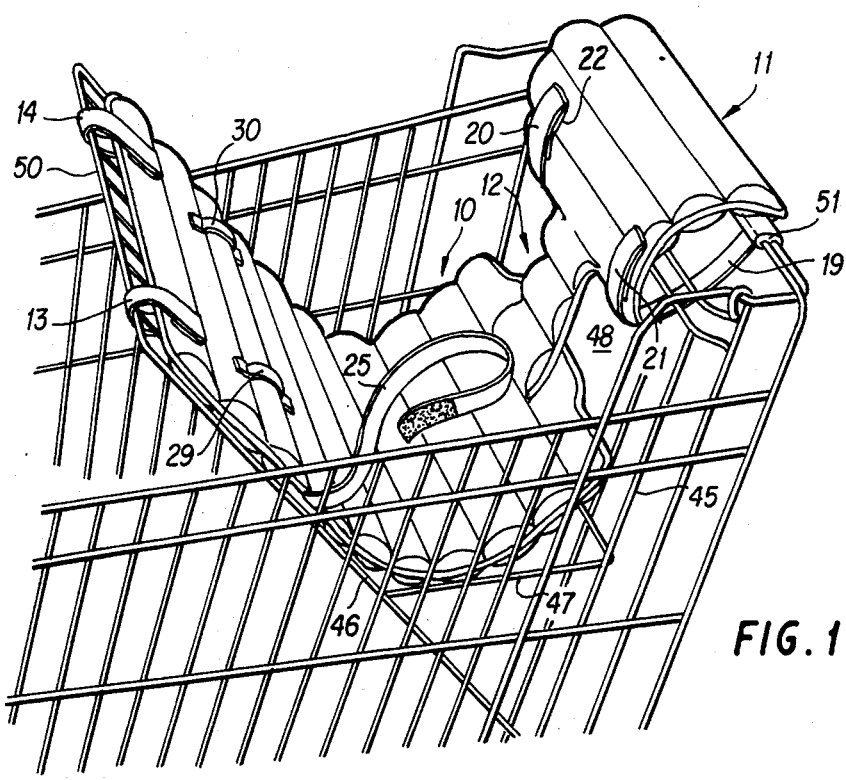
FIG. 1
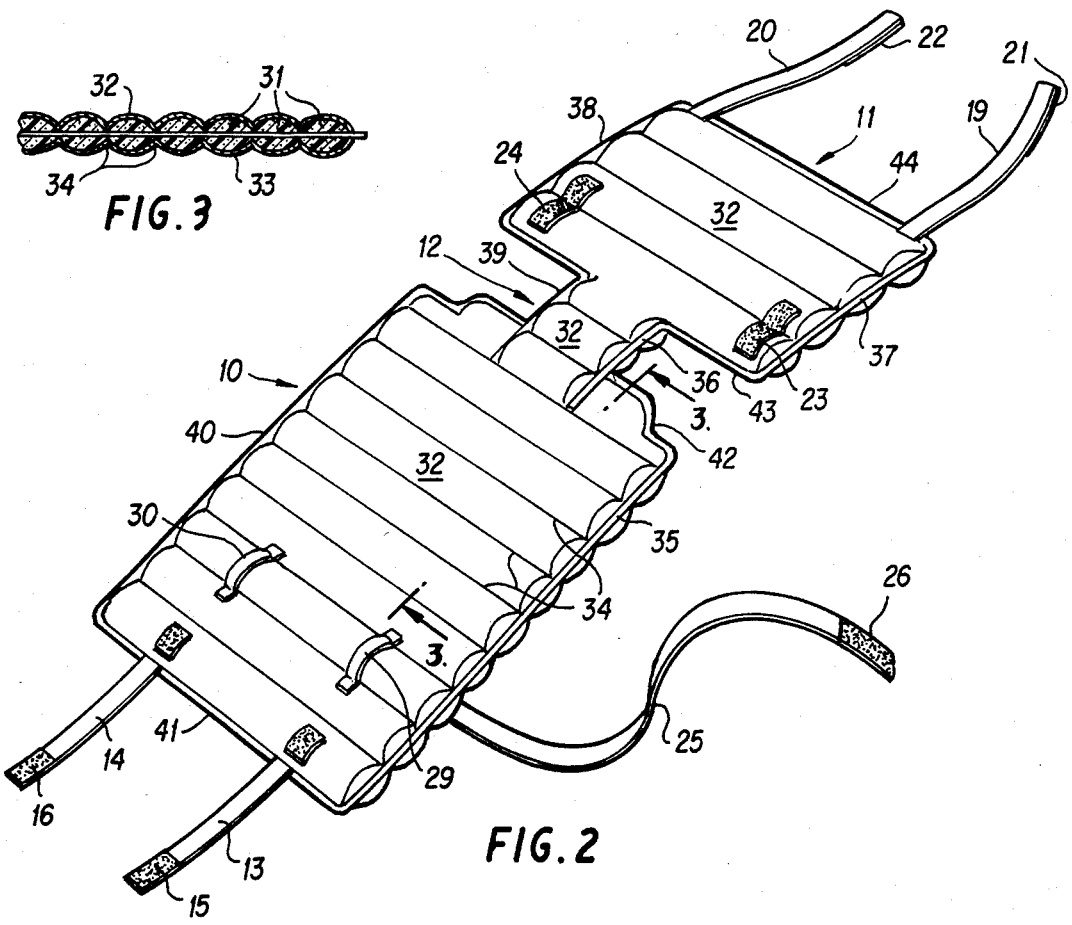
FIG. 3
FIG. 2

CHILD SHOPPING CART CUSHION

FIELD OF INVENTION

The present invention is in the general field of child safety devices. More particularly the present invention relates to the comfort and safety of a child when seated in the familiar shopping cart as made available in supermarkets and multi-service drug stores and like establishments.

BACKGROUND OF THE INVENTION

Supermarkets, major chain department stores and most major drug chain stores provide their customers with a large shopping cart, well known in size and appearance to the public. Frequently, the major department and drug stores also provide a small shopping cart. The shopping carts, large or small, have a forward pivoting grill section which when extended forwardly, provides a shelf compartment to hold small items or items which are susceptible to compression i.e., leafy vegetables, small quantities of fruits and vegetables and the like. Most small shopping carts and some large shopping carts have a continuous grill and fixed back side. A few small and most conventional large shopping carts have a back side which has a bifurcated backside opening and a pivotally mounted plastic plate which can be raised into contact the cart backside to close the bifurcated openings or left flat on the aforementioned shelf to accommodate the insertion of the legs of a child so the child faces the parent with its legs extending over the backside of the cart and its back resting against the aforesaid forwardly pivoting grill section. A child in such a shopping cart sits on the hard plastic plate, its back against the equally hard forward pivoting grill section and its legs and groin in contact with the rigid section of the backside of the shopping cart forming the bifurcated opening in the backside of the shopping cart. In addition to the discomfiture of being so seated, there is no restraint provided against the sideways movement of the child, either against the natural inclination of the child to reach out literally to grab at something or because of its lack of lateral stability because of its very youthful age. Currently, a very young child is carried by a parent in a chest carrier or a back carrier. The chest carrier is an inconvenience to the carrying parent when making selections of fruits and vegetables by the very nature of the forwardly extending protuberauce. A child too old to be in a chest or back carrier is placed on the shelf portion of the shopping cart primarily to prevent the child from wandering around to the discomfort and distraction of childless shoppers as well as to prevent such a child from satisfying its curiosity natural grabbing instincts of collecting any item within their reach. While the placement of older youngster within the bifurcated, shelf-seating backside of the shopping cart does provide a solution to the wandering, item-grabbing youngster there is yet possible a lateral movement by a child on the bifurcated shelf. The very nature of the metal grilled shopping cart and pivotable plastic plate is not a comfortable seating for a child. From observation, it may be assumed that the discomforture expressed by a young child in such a shopping cart is as much a discontent with being so restrained as being uncomfortable in such a seating arrangement.

As has been ascertained from the public records available, there is currently no device available which provides comfort to the child seated in a shopping cart or which can provide for the substantial restraint of the child against lateral movement.

SUMMARY OF THE PRESENT INVENTION

The present invention provides a cushioned seating device for a child seated on the shelf providing element of a shopping cart which device has a seating and back cushion and a cushioned groin protecting link attached to a chest protecting element. The invention additionally provides means to substantially stabilize a child against lateral movement when seated on the shopping cart shelf.

BRIEF DESCRIPTION OF THE DRAWINGS

The present invention may be seen in an illustrative embodiment as shown in the attached drawings.

FIG. 1 is a perspective view of the present invention emplaced in the seat section of a shopping cart.

FIG. 2 is a perspective view of the present invention in a laid-out position.

FIG. 3 is a cross section view of the present invention along the plane 3—3 in FIG. 2.

DETAILED DESCRIPTION OF THE INVENTION

With references to FIG. 2 the present invention comprises a cushioned pad having a seat-back portion 10 a chest portion 11, and an interconnecting groin portion 12. Attached to the outer and portion of seat-back portion 10 are spaced straps 13 and 14. Each downward facing end of straps 13 and 14 has a nylon locking segment 15 and 16. Attached to the undersurface of the outer end segment of seat-back portion 10 are nylon loop mating segments 17 and 18 (not visible), each positioned in alignment with respective attached straps 13 and 14. Chest portion 11 has attached at its outer periphery spaced apart straps 19 and 20. Each under face of straps 19 and 20 has affixed thereto a nylon locking segment 21 and 22. The upper surface of chest portion 11 has affixed on its inner upper surface a pair of spaced nylon loop mating segments 23 and 24 which are in alignment with their respective straps 19 and 20. Seat-back portion 10 also has attached thereto at one side a lateral constraining strap 25 secured to seat-back portion 10 at the upper side thereof as seen in FIGS. 1 and 2. Lateral constraining strap 25 has a nylon locking segment 26 secured to its outer end portion ,and an aligned nylon loop mating segment 27 (not visible) secured to the underside of back portion 10. Lateral constraining strap 25 provides control of lateral movement of a child of 1 or more years of age. To provide lateral restraint for a child less than one year of age, seatback portion 10 is provided with loops 29 and 30 through one or both of which lateral restraining strap 25 may be passed before the strap 25 is interlocked with its respective velcro interconnection.

Referring to FIG. 3, the present invention comprises a core of compressionable thermoplasitic foam material 31, each side of which is covered by a quick-drying fabric 32 and 33. To secure the fabric 32 and 33 to the core 30 are a plurality of cross seams 34. The lateral sides of the seat-back, chest and groin portions are secured to fabric covers 32 and 33 by seams 35, 37, 38, 39 and 40. The end portions of sear-back and chest portions 10 and 11 are secured by seams 41, 42, 43, and 44. The seams 35-44 may be made by stitching or by thermo welding.

Referring now to FIG. 1, there is shown a shopping cart with fixed grill back 45 and pivotable back portion 46 and shelf 47. Fixed backportion has opening 48 and opening 49 (not shown) for the legs of a child. The present invention is placed on shelf 47 with the seat-back portion 10 resting on the shelf 47 and the pivotable back portion 46. Straps 13 and 14 are passed over the top bar 50 of pivotable back 46 and secured to their respective nylon loop backing segments 15 and 16. Chest portion 11 is placed against fixed back grill 45 and straps 19 and 20 are passed over the top bar 51 of fixed back grill 45 and secured to their respective nylon loop locking segments 21 and 22. The child is there placed on the cushioned inserted shelf 47 with its legs respectively inserted through openings 48 and 49. Lateral constraining straps 25 and 26 are then joined together, either or both of which passing through loops 29 and/or 20, or neither, depending on the age of the child.

What is claimed is:

1. A shopping cart cushion for a child comprising a cushioned combined seat-back portion, a cushioned chest protecting portion and a cushioned groin-leg protection portion linking said seat-back portion having strap means on the outer end portion to secure said seat-back portion to the top bar of a forwardly pivoting grill section of a shopping cart which section when moved forward forms a seat with a back support, said chest protecting portion having first means on the outer end of said portion which are mated with second means on the inner end of said portion to secure said portion to the fixed back grill of said shopping cart, said grill having a bifurcated opening at the level of said seat, said groin-leg protecting portion thereby covering the portion of said back grill forming said bifurcated opening, said seat-back portion further having means on a lateral side thereof of the upper portion of said back portion to restrain the upper body of a child placed on said seat-back portion against lateral movement along said portion and forward movement therefrom, said restraining means being adjustable according to the size of the child, said lateral and forward movement restraining means comprising a strap secured to a side of the seat-back portion at the upper portion thereof so that the strap would pass under the arms and over the chest of a child placed on the cushion, the outer end of said strap having nylon loop engaging material pads thereon to secure the strap across the child's upper body to the backside of said back portion, and wherein said lateral movement restraining means further comprises a pair of spaced loops attached to the upper front surface of said seat-back portion in alignment with said strap through one or both of which loops said strap may be selectively passed to more securely restrain the body of a child depending upon the size of the child's body.

2. The cushion according to claim 1 wherein said cushion portions comprises a thermoplastic foamed material as a core with fabric covering on the upper and lower surfaces thereof, said fabrics being secured to said core by a plurality of spaced, parallel stitches perpendicular to the longitudinal axis of the cushion, the edges of said fabrics being secured to one another.

3. The cushion according to claim 1 wherein said seat-back portion securing means comprises a pair of spaced straps secured to the outer end of said portion, the upper end portions of said straps having nylon locking material affixed thereto, the upper end surface of said portion having nylon loop mating material pads affixed thereto in alignment with said straps.

4. The cushion according to claim 1 wherein said chest protecting portion securing means comprises a pair of spaced straps secured to the outer end of said portion, the lower end surfaces of said straps having nylon locking material affixed thereto, the upper surface on the end of said chest protecting portion opposite the end to which said straps are secured having nylon loop mating material pads affixed thereto in alignment with said straps.

* * * * *